(12) United States Patent
Miyazaki et al.

(10) Patent No.: US 9,079,583 B2
(45) Date of Patent: Jul. 14, 2015

(54) CONTROL DEVICE OF HYBRID VEHICLE

(75) Inventors: Terufumi Miyazaki, Toyota (JP); Yukihiko Ideshio, Nisshin (JP); Toshihiko Kamiya, Toyota (JP); Shingo Eto, Gamagori (JP); Hironori Asaoka, Nisshin (JP); Yasuyuki Kato, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 205 days.

(21) Appl. No.: 13/996,554

(22) PCT Filed: Dec. 24, 2010

(86) PCT No.: PCT/JP2010/073418
§ 371 (c)(1),
(2), (4) Date: Aug. 26, 2013

(87) PCT Pub. No.: WO2012/086075
PCT Pub. Date: Jun. 28, 2012

(65) Prior Publication Data
US 2014/0162839 A1  Jun. 12, 2014

(51) Int. Cl.
*B60W 20/00* (2006.01)
*B60K 6/48* (2007.10)
*B60W 10/02* (2006.01)
*B60W 10/06* (2006.01)
*B60W 10/08* (2006.01)
*B60W 30/192* (2012.01)

(52) U.S. Cl.
CPC .............. *B60W 20/40* (2013.01); *B60K 6/48* (2013.01); *B60W 10/02* (2013.01); *B60W 10/06* (2013.01); *B60W 10/08* (2013.01); *B60W 30/192* (2013.01); *B60Y 2300/64* (2013.01);

*Y02T 10/48* (2013.01); *Y02T 10/6221* (2013.01); *Y02T 10/6286* (2013.01); *Y10S 903/946* (2013.01); *Y10T 477/26* (2015.01)

(58) Field of Classification Search
None
See application file for complete search history.

(56) References Cited

U.S. PATENT DOCUMENTS

| 6,625,534 B2 * | 9/2003 | Suzuki et al. ................... 701/62 |
| 6,656,082 B1 * | 12/2003 | Yamada et al. ..................... 477/5 |
| 2002/0016660 A1 | 2/2002 | Suzuki et al. |

FOREIGN PATENT DOCUMENTS

| JP | 2002-51407 | 2/2002 |
| JP | 2006-22844 | 1/2006 |
| JP | 2007-237760 | 9/2007 |
| JP | 2009-1172 | 1/2009 |
| JP | 2010-018255 | 1/2010 |

* cited by examiner

*Primary Examiner* — Justin Holmes
(74) *Attorney, Agent, or Firm* — Finnegan, Henderson, Farabow, Garrett & Dunner, LLP

(57) ABSTRACT

In a case of engagement when a clutch K0 disposed between an engine 12 and a motor generator MG is engaged during EV running while a release instruction for the clutch K0 is output, drive of the engine 12 is changed such that a rotation speed $N_E$ of the engine 12 approaches a rotation speed $N_{MG}$ of the motor generator MG and, therefore, a drag torque of the engine 12 can be suppressed regardless of an engagement state of the clutch K0, and generation of longitudinal acceleration can be suppressed by reducing a slip time of the clutch K0. Therefore, a control device of a hybrid vehicle 10 can be provided that reduces a driver's uncomfortable feeling in a simplified manner in a case of wrong engagement of the clutch K0.

4 Claims, 8 Drawing Sheets

CONTROL DEVICE OF HYBRID VEHICLE

CROSS-REFERENCE TO RELATED APPLICATIONS

This application is a national phase application of International Application No. PCT/JP2010/073418, filed Dec. 24, 2010, the content of which is incorporated herein by reference.

TECHNICAL FIELD

The present invention relates to a control device of a hybrid vehicle including a clutch in a power transmission path between an engine and a motor generator and particularly to an improvement for reducing a driver's uncomfortable feeling in a simplified manner in a case of wrong engagement of the clutch.

BACKGROUND ART

A hybrid vehicle is known that includes a clutch in a power transmission path between an engine and a motor generator for controlling a power transmission through the power transmission path depending on an engagement state and that interrupts the power transmission through the power transmission path by releasing the clutch during EV running while only the motor generator is used as a drive source for running. Although a normally close type (normally-closed) hydraulic friction engagement device is preferably used as the clutch, if the clutch is wrongly engaged due to, for example, a failure of an electromagnetic control valve, a drag torque of the engine is generated, resulting in longitudinal acceleration (deceleration G), and a driver may feel uncomfortable. Therefore, a technique has been proposed that reduces a driver's uncomfortable feeling in the case of the wrong engagement of the clutch. For example, this corresponds to a drive controller for a hybrid vehicle described in Patent Document 1. According to this technique, it is considered that when a drag of the clutch is detected, a hydraulic pressure to the clutch can be increased to release the clutch and reduce the driver's uncomfortable feeling.

PRIOR ART DOCUMENT

Patent Document

Patent Document 1: Japanese Laid-Open Patent Publication No. 2009-1172

SUMMARY OF THE INVENTION

Problem to be Solved by the Invention

However, for example, in a configuration with the hydraulic pressure to the clutch controlled by one linear solenoid valve (single system), the conventional technique has a negative effect because if the wrong engagement of the clutch is attributable to breaking of wire etc., in the linear solenoid valve, the hydraulic pressure to the clutch becomes uncontrollable and the conventional technique cannot deal with the wrong engagement. For example, in a configuration including a linear solenoid valve Sol.1 along with a switching solenoid valve Sol.2 and a switching valve SV as depicted in FIG. 11 to control the hydraulic pressure to the clutch with these valves (duplex system), the conventional technique can deal with the wrong engagement; however, a hydraulic control circuit disadvantageously becomes complicated in this form. Therefore, a control device of a hybrid vehicle is not yet developed at present that reduces a driver's uncomfortable feeling in a simplified manner in a case of wrong engagement of a clutch disposed between an engine and a motor generator.

The present invention was conceived in view of the situations and it is therefore an object of the present invention to provide a control device of a hybrid vehicle reducing a driver's uncomfortable feeling in a simplified manner at the time of wrong engagement of a clutch disposed between an engine and a motor generator.

Means for Solving the Problem

To achieve the object, the present invention provides a control device of a hybrid vehicle having a clutch in a power transmission path between an engine and a motor generator, the clutch controlling power transmission through the power transmission path depending on an engagement state, the hybrid vehicle interrupting the power transmission through the power transmission path by releasing the clutch during EV running, only the motor generator being used as a drive source for running in the EV running, wherein in a case of engagement where the clutch is engaged during the EV running while a release instruction for the clutch is output, drive of the engine is changed such that a rotation speed of the engine approaches a rotation speed of the motor generator, and in the case of the engagement, an upper limit value of the engine torque is defined based on a rotation speed difference between the rotation speed of the engine and the rotation speed of the motor generator.

Consequently, in the case of the engagement where the clutch is engaged during the EV running while the release instruction for the clutch is output, the drive of the engine is changed such that the rotation speed of the engine approaches the rotation speed of the motor generator, and in the case of the engagement, the upper limit value of the engine torque is defined based on the rotation speed difference between the rotation speed of the engine and the rotation speed of the motor generator and, therefore, a drag torque of the engine can be suppressed regardless of the engagement state of the clutch, and generation of longitudinal acceleration can be suppressed by reducing a slip time of the clutch. Therefore, the control device of the hybrid vehicle can be provided that reduces a driver's uncomfortable feeling in a simplified manner in a case of wrong engagement of the clutch disposed between the engine and the motor generator.

Preferably, in the case of the engagement, the engine is allowed to idle. Consequently, an engine brake torque can be suppressed regardless of the engagement state of the clutch and a deceleration feeling can preferably be reduced in a case of wrong engagement of the clutch.

Preferably, in the case of the engagement, hybrid running is performed with the engine and the motor generator used as drive sources for running Consequently, a shift to the hybrid running can be made in accordance with the engagement state of the clutch to preferably reduce a driver's uncomfortable feeling.

Preferably, a second clutch is included in a power transmission path between the motor generator and drive wheels, wherein the second clutch controls power transmission through the power transmitting path depending on an engagement state, and wherein if the rotation speed of the engine is increased in the case of the engagement, a transmission torque of the second clutch is reduced. Consequently, the deceleration feeling in a case of wrong engagement of the clutch can more preferably be reduced.

MODE FOR CARRYING OUT THE INVENTION

A preferred embodiment of the present invention will now be described in detail with reference to the drawings.

Embodiment

Figure 1:
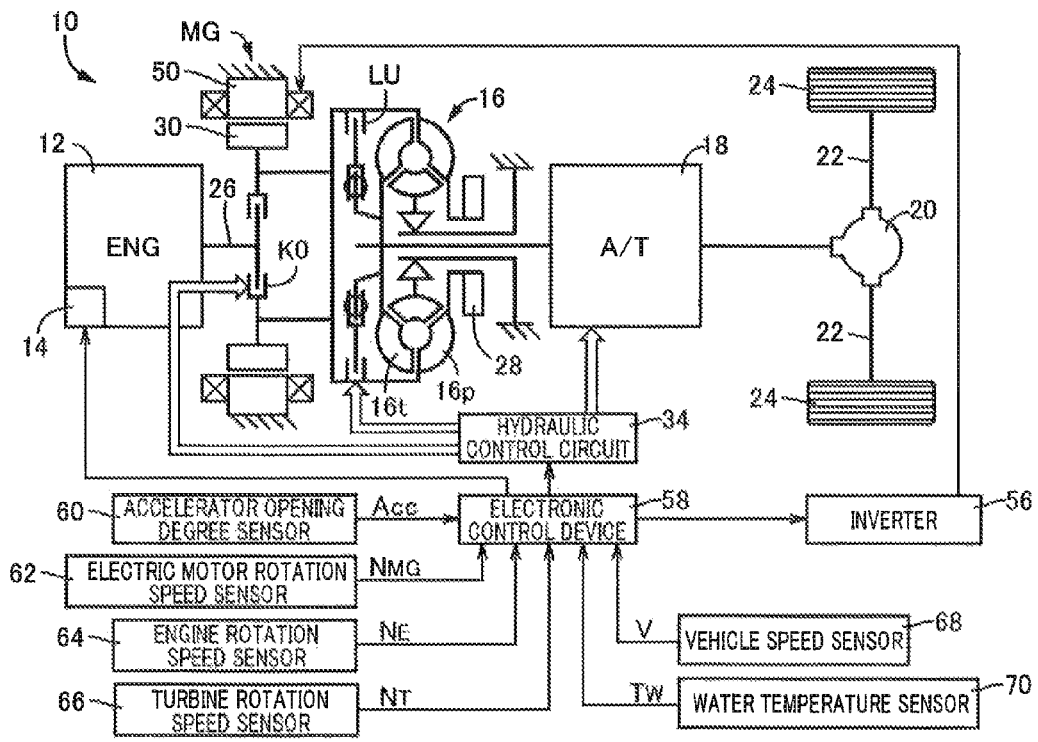
FIG. 1 is a conceptual diagram of a drive system according to a control device of a hybrid vehicle that is one embodiment of the present invention.

FIG. 1 is a conceptual diagram of a drive system according to a control device of a hybrid vehicle that is one embodiment of the present invention. A hybrid vehicle 10 depicted in FIG. 1 includes an engine 12 and a motor generator MG acting as drive sources and drive power generated by the engine 12 and the motor generator MG is transmitted through each of a torque converter 16, an automatic transmission 18, a differential gear device 20, and a pair of left and right axles 22 to a pair of left and right drive wheels 24. Because of this configuration, the hybrid vehicle 10 is driven by using at least one of the engine 12 and the motor generator MG as a drive source for running. Therefore, the hybrid vehicle 10 selectively establishes any one of engine running using only the engine 12 as the drive source for running, EV running (motor running) using only the motor generator MG as the drive source for running, and hybrid running using the engine 12 and the motor generator MG as the drive sources for running.

The engine 12 is an internal combustion engine such as cylinder-injection gasoline and diesel engines in which fuel is directly injected into a combustion chamber, for example, and is preferably started by driving the motor generator MG. To control the drive (output torque) of the engine 12, an output control device 14 is disposed that includes a throttle actuator providing opening/closing control of an electronic throttle valve, a fuel injection device providing fuel injection control, and an ignition device providing ignition timing control. The output control device 14 controls the opening/closing of the electronic throttle valve with the throttle actuator for throttle control in accordance with instructions supplied from an electronic control device 58 described later, controls fuel injection by the fuel injection device for the fuel injection control, and controls timing of ignition by the ignition device for the ignition timing control, thereby providing the output control of the engine 12.

The motor generator MG is an electric motor having functions of a motor mover) generating a drive force and a generator (electric generator) generating a reactive force, and a power transmission path between the engine 12 and the motor generator MG is disposed with a clutch K0 controlling a power transmission through the power transmission path depending on an engagement state. In particular, a crankshaft 26 is an output member of the engine 12 and is selectively coupled via the clutch K0 to a rotor 30 of the motor generator MG. The rotor 30 of the motor generator MG is coupled to a front cover 32 that is an input member of the torque converter 16.

The clutch K0 is, for example, a multiplate hydraulic friction engagement device subjected to engagement control of a hydraulic actuator and has an engagement state thereof controlled between engagement (complete engagement), slip engagement, and release (complete release) in accordance with an oil pressure supplied from a hydraulic control circuit 34. The engagement of the clutch K0 causes the power transmission (connection) through the power transmission path between the crankshaft 26 and the front cover 32 while the release of the clutch K0 interrupts the power transmission through the power transmission path between the crankshaft 26 and the front cover 32. The slip engagement of the clutch K0 causes the power transmission corresponding to a transmission torque of the clutch K0 through the power transmission path between the crankshaft 26 and the front cover 32.

The automatic transmission 18 is a stepped automatic transmission in which any one of a plurality of predefined shift stages (gear ratios) is selectively established, for example, and is configured with a plurality of engagement elements for the gear shifting. For example, the automatic transmission 18 includes a plurality of hydraulic friction engagement devices such as multiplate clutches and brakes subjected to engagement control of hydraulic actuators and a plurality of the hydraulic friction engagement devices are engaged or released in accordance with oil pressure supplied from the hydraulic control circuit 34, thereby selectively establishing any one of a plurality of (e.g., first speed to sixth speed) forward shift stages (forward gear stages, forward running gear stages) or a backward shift stage (backward gear stage, backward running gear stage) in accordance with a combination of coupling states of the hydraulic friction engagement devices.

Figure 2:
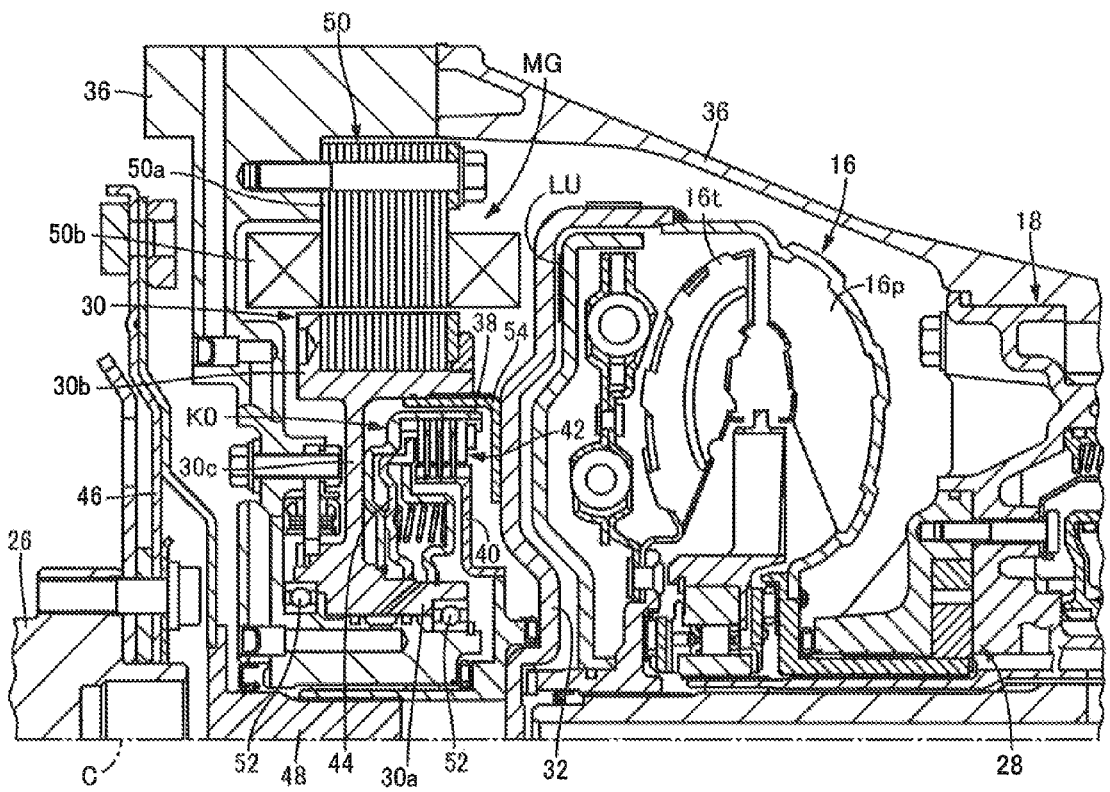
FIG. 2 is a partially cutaway cross-sectional view for explaining a configuration around a motor generator and a torque converter in the hybrid vehicle of FIG. 1.

FIG. 2 is a partially cutaway cross-sectional view for explaining a configuration around the motor generator MG and the torque converter 16 in the hybrid vehicle 10 of FIG. 1. The motor generator MG the torque converter 16, the automatic transmission 18, and the crankshaft 26 are configured substantially symmetrically relative to an axial center C common thereto and lower halves from the axial center C are not depicted in FIG. 2. As depicted in FIG. 2, the motor generator MG, the torque converter 16, and the automatic transmission 18 are all housed in a transmission case 36. The transmission case 36 is a split-type case made of die-cast aluminum, for example, and is fixed to a non-rotating member such as a vehicle body.

The clutch K0 includes a cylindrical clutch drum 38, a cylindrical clutch hub 40 having a diameter smaller than the clutch drum 38 and disposed concentrically with and relatively rotatably to the clutch drum 38, a friction engagement member 42 disposed in an annular gap between the clutch drum 38 and the clutch hub 40, and a clutch piston 44 pressing the friction engagement member 42 in the axial center C direction. The clutch drum 38 is integrally fixed to a boss portion 30a in the rotor 30 of the motor generator MG by welding, for example, and is integrally rotated with the rotor 30. The friction engagement member 42 includes a plurality of annular plate-shaped separators engaged relatively non-rotatably with the clutch drum 38, and a plurality of annular plate-shaped friction plates each disposed between the multiple separators and engaged relatively non-rotatably with the clutch hub 40.

In the clutch K0 configured in this way, the friction engagement member 42 is pressed by the clutch piston 44 in the axial center C direction and the separators and the friction plates are frictionally engaged with each other, thereby suppressing relative rotation between the clutch drum 38 and the clutch hub 40. Therefore, the frictional engagement between the separators and the friction plates of the friction engagement member 42 enables mutual power transmission between the clutch drum 38 and the clutch hub 40. The clutch K0 is preferably a normally close type (normally-closed) clutch engaged while no instruction is output from the electronic control device 58 described later.

The crankshaft 26 has an output end portion, i.e., one end portion closer to the motor generator MG, coupled via a drive plate 46 etc., to a rotation shaft 48 rotated integrally with the clutch hub 40 of the clutch K0. Therefore, the crankshaft 26 and the clutch hub 40 are coupled via the drive plate 46, the rotation shaft 48, etc., to each other so as to rotate integrally around the common axial center C. A pump impeller 16p of the torque converter 16 is coupled to a mechanical hydraulic pump 28, and an oil pressure is generated by the hydraulic pump 28 in accordance with the rotation of the pump impeller 16p and is supplied as an original pressure to the hydraulic control circuit 34.

Between the pump impeller 16p and a turbine impeller 16t of the torque converter 16, a lockup clutch LU is disposed for direct coupling so that the pump impeller 16p and the turbine impeller 16t are integrally rotated. The lockup clutch LU has an engagement state thereof controlled between engagement (complete engagement), slip engagement, and release (complete release) in accordance with the oil pressure supplied from the hydraulic control circuit 34. Therefore, the lockup clutch LU corresponds to a second clutch disposed in a power transmission path between the motor generator MG and the drive wheels 24 to control the power transmission through the power transmission path depending on the engagement state.

The motor generator MG includes the rotor 30 supported rotatably around the axial center C by the transmission case 36 on the outer circumferential side of the rotation shaft 48 and a stator 50 integrally fixed to the transmission case 36 on the outer circumferential side of the rotor 30. The rotor 30 includes the cylindrical boss portion 30a supported rotatably via a pair of bearings 52 by the transmission case 36, a rotor portion 30b having a plurality of annular steel plates stacked in the axial center C direction with a slight gap from the stator 50 on the inner circumferential side of the stator 50, and a coupling portion 30c integrally coupling the boss portion 30a and the rotor portion 30b. The rotor 30 is coupled to the front cover 32 via a transmitting member 54 coupled to the inner circumferential side of the rotor portion 30b and fixed integrally to the front cover 32 by welding, for example. The stator 50 includes a core 50a having a plurality of annular steel plates stacked in the axial center C direction and a plurality of coils 50b wound around a portion in a circumferential direction of an inner circumferential portion of the core 50a and disposed serially in the circumferential direction. The core 50a is integrally fixed to the transmission case 36 at a plurality of positions in the circumferential direction by bolts etc.

The motor generator MG configured in this way is connected via an inverter 56 depicted in FIG. 1 to an electric storage device not depicted such as a battery and a capacitor, and a drive current supplied to the coils 50b is adjusted by controlling the inverter 56 by the electronic control device 58 described later, thereby controlling the drive of the motor generator MG. In other words, the inverter 56 is controlled by the electronic control device 58, thereby increasing and decreasing an output torque of the motor generator MG. Although the output torque from the motor generator MG is output only to the torque converter 16 while the clutch K0 is released (not engaged), a portion of the output torque is output to the torque converter 16 and the other portion is output to the engine 12 while the clutch K0 is engaged.

When the engine 12 is started, the engine 12 is rotationally driven by a torque for engine start transmitted from the motor generator MG via the clutch K0 and, as a result, while an engine rotation speed $N_E$ is increased, the engine 12 is started by controlling engine ignition, fuel supply, etc. Therefore, the engine 12 is started by rotationally driving the engine 12 with a torque acquired from explosion energy due to ignition and a torque acquired from engagement energy due to the clutch K0, i.e., an engine starting torque transmitted from the motor generator MG via the clutch K0.

The hybrid vehicle 10 includes a control system as exemplarily illustrated in FIG. 1. The electronic control device 58 depicted in FIG. 1 includes a so-called microcomputer including a CPU, a RAM, a ROM, and an input/output interface, and the CPU executes signal processes in accordance with programs stored in advance in the ROM while utilizing a temporary storage function of the RAM, thereby providing basic control such as the drive control of the engine 12, the start control of the engine 12, the drive control of the motor generator MG, the shift control of the automatic transmission 18, the engagement force control of the clutch K0, and the engagement control of the lockup clutch LU, along with various types of control such as control in a case of wrong engagement of the clutch K0 of this embodiment described later. Therefore, the electronic control device 58 functions as a control device of the hybrid vehicle 10 depicted in FIG. 1.

As depicted in FIG. 1, the electronic control device 58 is supplied with various input signals detected by sensors disposed on the hybrid vehicle 10. For example, the electronic control device 58 receives inputs of a signal indicative of an accelerator opening degree $A_{CC}$ detected by an accelerator opening degree sensor 60, a signal indicative of a rotation speed (electric motor rotation speed) $N_{MG}$ of the motor generator MG detected by an electric motor rotation speed sensor 62, a signal indicative of the rotation speed (engine rotation speed) $N_E$ of the engine 12 detected by an engine rotation speed sensor 64, a signal indicative of a rotation speed (turbine rotation speed) $N_T$ of the turbine impeller 16t of the torque converter 16 detected by a turbine rotation speed sensor 66, a signal indicative of a vehicle speed V detected by a vehicle speed sensor 68, and a signal indicative of a cooling water temperature $T_W$ of the engine 12 detected by a water temperature sensor 70. The rotation speed $N_{MG}$ of the motor generator MG detected by the electric motor rotation speed sensor 62 is an input rotation speed of the torque converter 16 and corresponds to the rotation speed of the pump impeller 16p of the torque converter 16. The rotation speed $N_T$ of the turbine impeller 16t detected by the turbine rotation speed sensor 66 is an output rotation speed of the torque converter 16 and corresponds to an input rotation speed of the automatic transmission 18.

The electronic control device 58 supplies various output signals to the devices disposed on the hybrid vehicle 10. For example, the electronic control device 58 supplies to the portions a signal supplied to the output control device 14 of the engine 12 for the drive control of the engine 12, a signal supplied to the inverter 56 for the drive control of the motor generator MG, a signal supplied to a plurality of electromagnetic control valves in the hydraulic control circuit 34 for the shift control of the automatic transmission 18, a signal supplied to a first linear solenoid valve SL1 (see FIG. 3) in the hydraulic control circuit 34 for the engagement control of the clutch K0, and a signal supplied to a second linear solenoid valve SL2 (see FIG. 3) in the hydraulic control circuit 34 for the engagement control of the lockup clutch LU.

Figure 3:
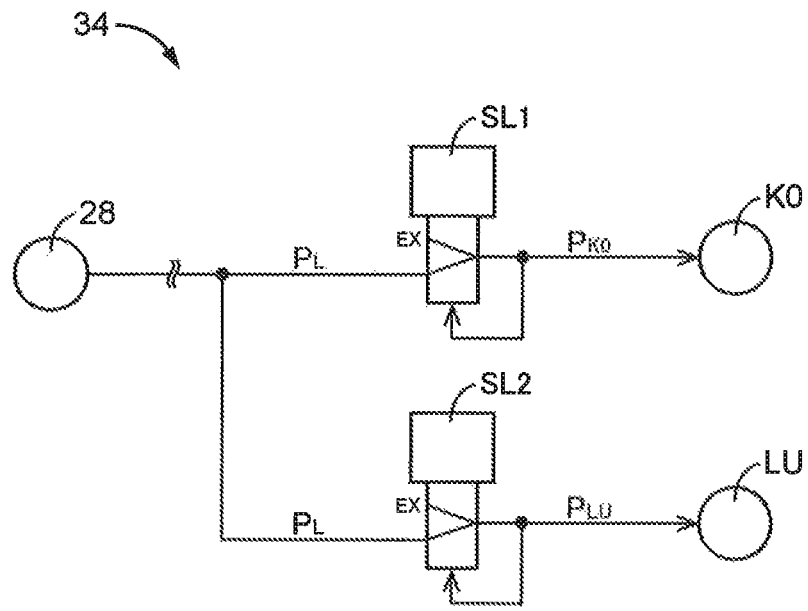
FIG. 3 is a diagram for explaining a configuration related to hydraulic control of a clutch and a lockup clutch in a hydraulic control circuit included in the hybrid vehicle of FIG. 1.

FIG. 3 is a diagram for explaining a configuration related to the hydraulic control of the clutch K0 and the lockup clutch LU in the hydraulic control circuit 34. As depicted in FIG. 3, the hydraulic control circuit 34 includes the first linear solenoid valve SL1 adjusting an oil pressure $P_{K0}$ supplied to a hydraulic actuator included in the clutch K0 and the second linear solenoid valve SL2 adjusting an oil pressure $P_{LU}$ supplied to a hydraulic actuator included in the lockup clutch LU. Both the first linear solenoid valve SL1 and the second linear solenoid valve SL2 use as an original pressure, for example, a line pressure $P_L$ adjusted from an oil pressure supplied from the hydraulic pump 28 and have a communication state between an input port and an output port or a drain port changed in accordance with an electromagnetic power of a solenoid controlled based on an instruction signal supplied from the electronic control device 58, thereby adjusting the oil pressures $P_{K0}$ and $P_{LU}$, respectively, corresponding to the instruction signal and supplying the oil pressures to the hydraulic actuators for controlling the respective engagements of the clutch K0 and the lockup clutch LU.

Figure 4:
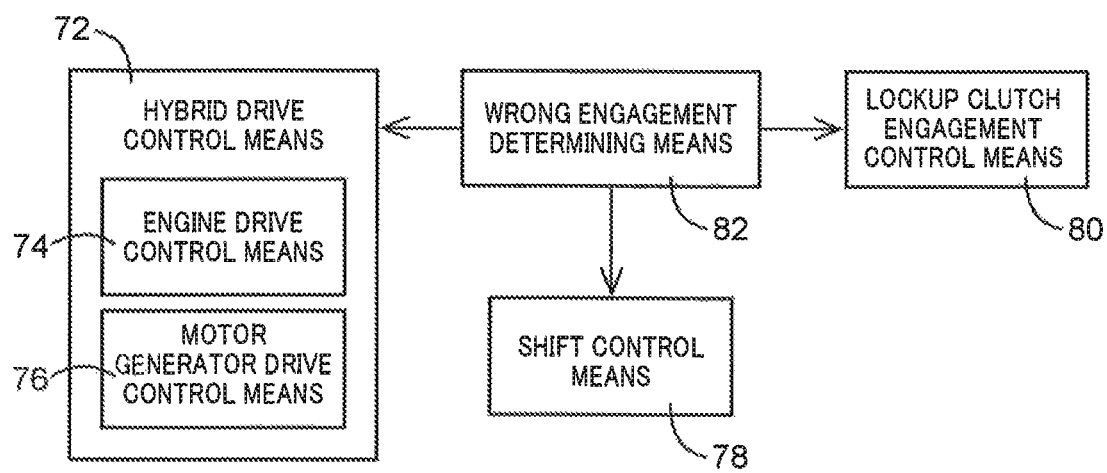
FIG. 4 is a functional block diagram for explaining a main portion of a control function included in an electronic control device in the hybrid vehicle of FIG. 1.

FIG. 4 is a functional block diagram for explaining a main portion of a control function included in the electronic control device 58. A hybrid drive control means 72 depicted in FIG. 4 provides hybrid drive control in the hybrid vehicle 10. Therefore, as depicted in FIG. 4, the hybrid drive control means 72 includes an engine drive control means 74 controlling the drive (output torque) of the engine 12 via the output control device 14 and a motor generator drive control means 76 controlling the drive of the motor generator MG via the inverter 56 and provides the drive control of the hybrid vehicle 10 by the engine 12 and the motor generator MG via the engine drive control means 74 and the motor generator drive control means 76. For example, the hybrid drive control means 72 selectively establishes, in accordance with a running state of the hybrid vehicle 10, an EV running mode in which only the motor generator MG is used as the drive source for running with the engine 12 stopped, an engine running mode in which only the engine 12 is used as the drive source for running, and a hybrid running mode in which both the engine 12 and the motor generator MG are used as the drive sources for running with the motor generator MG performing regeneration (electric generation) depending on the running state.

In the EV running mode, the hybrid drive control means 72 uses only the motor generator MG as the drive source for running to provide the running control of the hybrid vehicle 10. In particular, the hybrid drive control means 72 determines an required output shaft torque from a preliminarily stored drive power map based on the accelerator opening degree $A_{CC}$ considered as an output request amount from a driver, the vehicle speed V, etc., and calculates a required drive power from the required output shaft torque in consideration of a charge request value etc. The hybrid drive control means 72 controls the drive (output torque) of the motor generator MG such that the required drive power is acquired. In the EV running mode, the drive of the engine 12 is stopped and the clutch K0 is released (completely released). As a result, the power transmission path between the engine 12 and the motor generator MG is interrupted and the power is not transmitted from the engine 12 to the lockup clutch LU side while the torque is not transmitted from the lockup clutch LU side to the engine 12.

In the engine running mode, the hybrid drive control means 72 uses only the engine 12 as the drive source for running to provide the running control of the hybrid vehicle 10. In particular, the hybrid drive control means 72 calculates target engine output such that the required drive power obtained as described above is acquired, and controls the drive of the engine 12 to achieve the engine rotation speed $N_E$ and an engine torque for acquiring the target engine output while operating the engine 12 along an optimum fuel consumption rate curve (fuel consumption map, relationship) of the engine 12 empirically obtained and stored in advance such that both the drivability and the fuel consumption property are satisfied. In the engine running mode, the clutch K0 is engaged (completely engaged). Although the motor generator MG is idled, the motor generator MG may be operated to perform regeneration depending on a running state.

In the hybrid running mode, the hybrid drive control means 72 uses both the engine 12 and the motor generator MG as the drive sources for running to provide the running control of the hybrid vehicle 10. In particular, the hybrid drive control means 72 calculates target engine output such that the required drive power obtained as described above is acquired in consideration of a transmission loss, an accessory load, an assist torque of the motor generator MG, etc., and controls the drive of the engine 12 and the motor generator MG to achieve the engine rotation speed $N_E$ and the engine torque for acquiring the target engine output while operating the engine 12 along the optimum fuel consumption rate curve (fuel consumption map, relationship) of the engine 12 empirically obtained and stored in advance such that both the drivability and the fuel consumption property are satisfied.

The hybrid drive control means 72 controls the regeneration (electric generation) by the motor generator MG. In particular, if the execution of the regeneration is determined from a predefined relationship based on the accelerator opening degree $A_{CC}$ considered as an output request amount from a driver, the hybrid drive control means 72 controls the operation of the motor generator MG such that the motor generator MG performs the regeneration. The electric energy generated by the regeneration of the motor generator MG is accumulated via the inverter 56 in the electric storage device not depicted. When the motor generator MG is used as the drive source, the electric energy is supplied from the electric storage device via the inverter 56 to the motor generator MG to generate drive power.

A shift control means 78 depicted in FIG. 4 provides the shift control of the automatic transmission 18 based on a state of the hybrid vehicle 10 in accordance with a predefined relationship. For example, the shift control means 78 determines a shift stage to be established in the automatic transmission 18 based on the vehicle speed V detected by the vehicle speed sensor 68, the required drive power, etc. and in accordance with a predetermined shifting map, and controls the oil pressure supplied to the automatic transmission 18 such that the shift stage is established. Specifically, the shift control means 78 controls the actuation (output oil pressure) of an electronic control valve included in the hydraulic control circuit 34 to control the oil pressure supplied from the hydraulic control circuit 34 to the hydraulic actuators of the hydraulic friction engagement devices in the automatic transmission 18.

A lockup clutch engagement control means 80 controls the engagement state of the lockup clutch LU included in the torque converter 16. For example, the lockup clutch LU is engaged (completely engaged), released (completely released), or put into the slip engagement in a certain range in accordance with a predefined lockup diagram based on the vehicle speed V detected by the vehicle speed sensor 68, the required drive power, etc. Specifically, the lockup clutch engagement control means 80 controls an excitation current of a solenoid included in the second linear solenoid valve SL2 included in the hydraulic control circuit 34, thereby controlling the oil pressure $P_{LU}$ adjusted by the second linear solenoid valve SL2 and related to the engagement control of the lockup clutch LU.

A wrong engagement determining means 82 determines wrong engagement of the clutch K0. In particular, the wrong engagement determining means 82 determines whether the clutch K0 is wrongly engaged, for example, even though a release instruction for the clutch K0 is output in the EV running mode etc. Specifically, the wrong engagement determining means 82 determines the wrong engagement of the clutch K0 based on a change in the rotation speed $N_E$ of the engine 12 detected by the engine rotation speed sensor 64. As described above, in the EV running mode, the release instruction for the clutch K0 is output and the clutch K0 is released through the control of the output oil pressure from the first linear solenoid valve SL1 of the hydraulic control circuit 34 etc., while the drive of the engine 12 is stopped. Although the rotation speed $N_E$ of the engine 12 detected by the engine rotation speed sensor 64 is normally zero in this state, if the clutch K0 is wrongly engaged due to failure of the first linear solenoid valve SL1 etc., a drag torque of the engine 12 is generated, increasing the rotation speed $N_E$ of the engine 12 detected by the engine rotation speed sensor 64. Therefore, the wrong engagement determining means 82 preferably determines that the clutch K0 is wrongly engaged if the rotation speed $N_E$ of the engine 12 detected by the engine rotation speed sensor 64 starts increasing in the EV running mode. If the drag torque of the engine 12 is generated, the rotation speed $N_{MG}$ of the motor generator MG is accordingly reduced and, therefore, the wrong engagement determining means 82 may determine the wrong engagement of the clutch K0 based on the rotation speed $N_{MG}$ of the motor generator MG, i.e., the rotation speed $N_{MG}$ detected by the electric motor rotation speed sensor 62.

If the wrong engagement determining means 82 determines the wrong engagement of the clutch K0, the engine drive control means 74 controls the drive of the engine 12 such that the rotation speed $N_E$ of the engine 12 approaches the rotation speed $N_{MG}$ of the motor generator MG. In particular, if the wrong engagement determining means 82 determines the wrong engagement of the clutch K0, the engine drive control means 74 starts ignition (firing) by the ignition device included in the output control device 14 at least such that the drive of the engine 12 is started. Preferably, if the wrong engagement determining means 82 determines the wrong engagement of the clutch K0, the engine drive control means 74 provides idling control (idle torque control) allowing the engine 12 to idle. Preferably, the engine drive control means 74 controls the drive (rotation speed, output torque) of the engine 12 via the output control device 14 such that a rotation speed difference is reduced as far as possible between the rotation speed $N_E$ of the engine 12 detected by the engine rotation speed sensor 64 and the rotation speed $N_{MG}$ of the motor generator MG detected by the electric motor rotation speed sensor 62.

If the wrong engagement determining means 82 determines the wrong engagement of the clutch K0 in the EV running mode, the hybrid drive control means 72 preferably makes a shift to the hybrid running mode in which the engine 12 and the motor generator MG are used as the power sources for running. In particular, even when the establishment of the EV running mode is determined, the hybrid running mode is established in accordance with the actual condition in which the clutch K0 cannot be released and remains in the engaged state. Preferably, if the wrong engagement determining means 82 determines the wrong engagement of the clutch K0 in the EV running mode, the hybrid drive control means 72 makes a shift to the engine running mode in which only the engine 12 is used as the power source. In particular, the engine running mode is established even when the establishment of the EV running mode is determined.

If the engine 12 is driven after the wrong engagement determining means 82 determines the wrong engagement of the clutch K0, the engine drive control means 74 preferably defines an upper limit value of the engine torque based on a rotation speed difference $\Delta N (=|N_{MG}-N_E|)$ between the rotation speed $N_E$ of the engine 12 and the rotation speed $N_{MG}$ of the motor generator MG. For example, the engine drive control means 74 determines the output torque of the engine 12 when the rotation speed difference $\Delta N$ between the rotation speed $N_E$ of the engine 12 and the rotation speed $N_{MG}$ of the motor generator MG becomes other than zero, i.e., when a slip (sliding) occurs in the clutch K0, as the upper limit torque of the engine 12 in the subsequent control. In other words, the transmission torque of the clutch K0 is estimated based on an estimated output torque of the engine 12 at the time of detection of the differential rotation of the clutch K0, and the estimated output torque of the engine 12 at this time point is set as the upper limit torque of the engine 12 in the subsequent control.

If the wrong engagement determining means 82 determines the wrong engagement of the clutch K0 and the rotation speed $N_E$ of the engine 12 is increased, the lockup clutch engagement control means 80 preferably reduces the transmission torque of the lockup clutch LU. Specifically, the lockup clutch engagement control means 80 controls the excitation current of the solenoid included in the second linear solenoid valve SL2 included in the hydraulic control circuit 34, thereby controlling the oil pressure $P_{LU}$ adjusted by the second linear solenoid valve SL2 and related to the engagement control of the lockup clutch LU, so as to reduce the engagement pressure of the lockup clutch LU. As a result, even if the engagement of the lockup clutch LU is determined, the lockup clutch LU is put into the released or slip engagement state.

The hybrid drive control means 72 preferably provides feedback control so as to keep the output rotation speed constant when the wrong engagement determining means 82 determines the wrong engagement of the clutch K0 and detects an increase in the rotation speed of the engine 12. This output rotation speed corresponds to the rotation speed of the drive wheels 24 and is, for example, the output rotation speed of the torque converter 16. Therefore, the hybrid drive control means 72 preferably provides the feedback control so as to subsequently maintain at a constant value the turbine rotation speed $N_T$ detected by the turbine rotation speed sensor 66 when the wrong engagement determining means 82 determines the wrong engagement of the clutch K0 and detects an increase in the rotation speed of the engine 12. Specifically, the hybrid drive control means 72 controls (corrects) the output torques of the engine 12 and the motor generator MG such that the turbine rotation speed $N_T$ is kept at a constant value. The feedback control may be provided by controlling the drive of the motor generator MG while the idle torque control for the engine 12 is continued.

If the wrong engagement determining means 82 determines the wrong engagement of the clutch K0 and detects an increase in the rotation speed of the engine 12, the shift control means 78 preferably makes a shift to a shift stage on the higher speed side (lower gear ratio side) as compared to the shift stage established at this time point in the automatic transmission 18. For example, when the automatic transmission 18 is a stepped transmission having six forward speeds, if the fourth forward speed is established in the automatic transmission 18 when the wrong engagement determining means 82 determines the wrong engagement of the clutch K0 and detects an increase in the rotation speed of the engine 12, an upshift to the fifth or sixth forward speed is made in the automatic transmission 18. This reduces a decelerating force corresponding to the increase in the rotation speed of the engine 12 and the driver's uncomfortable feeling can preferably be suppressed.

Figure 5:
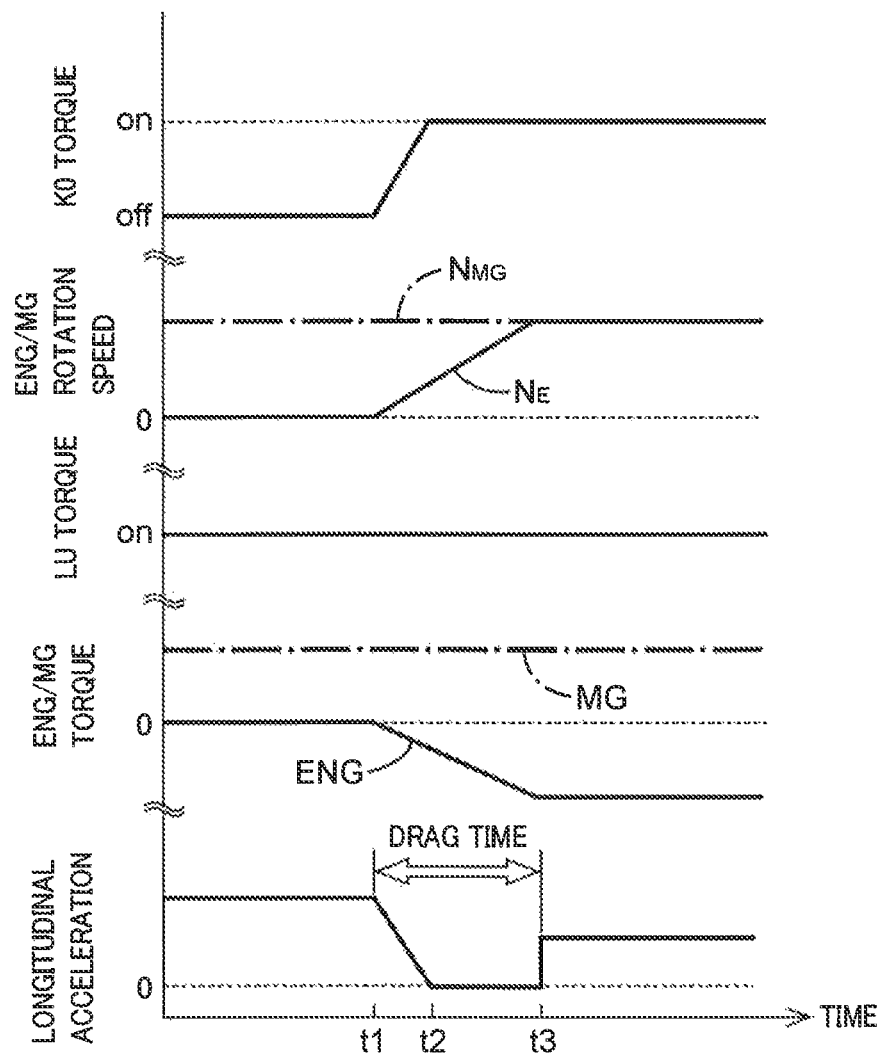
FIG. 5 is a time chart of relevant values such as rotation speeds of portions and longitudinal acceleration generated in a vehicle when the clutch is wrongly engaged in conventional technology for comparison with the present invention.
Figure 6:
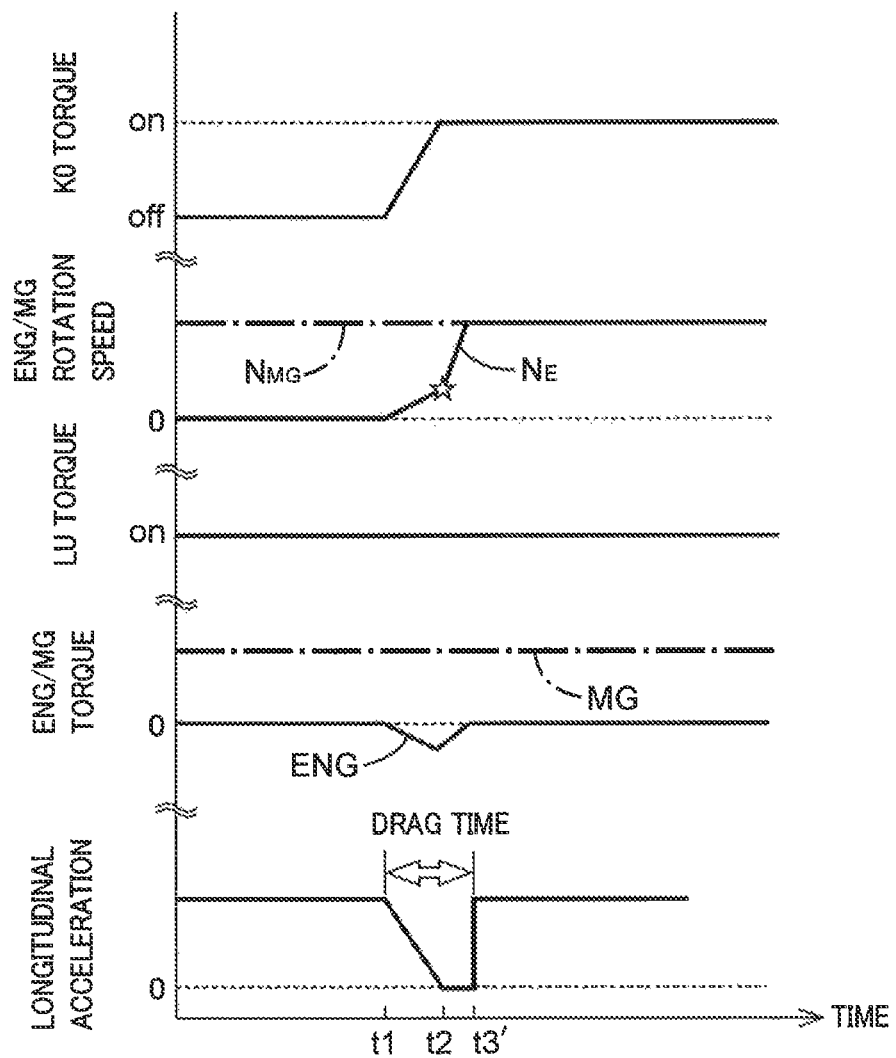
FIG. 6 is a time chart of relevant values such as rotation speeds of the portions and longitudinal acceleration generated in a vehicle associated with control of this embodiment when the clutch in the hybrid vehicle of FIG. 1 is wrongly engaged in comparison to the example depicted in FIG. 5.
Figure 7:
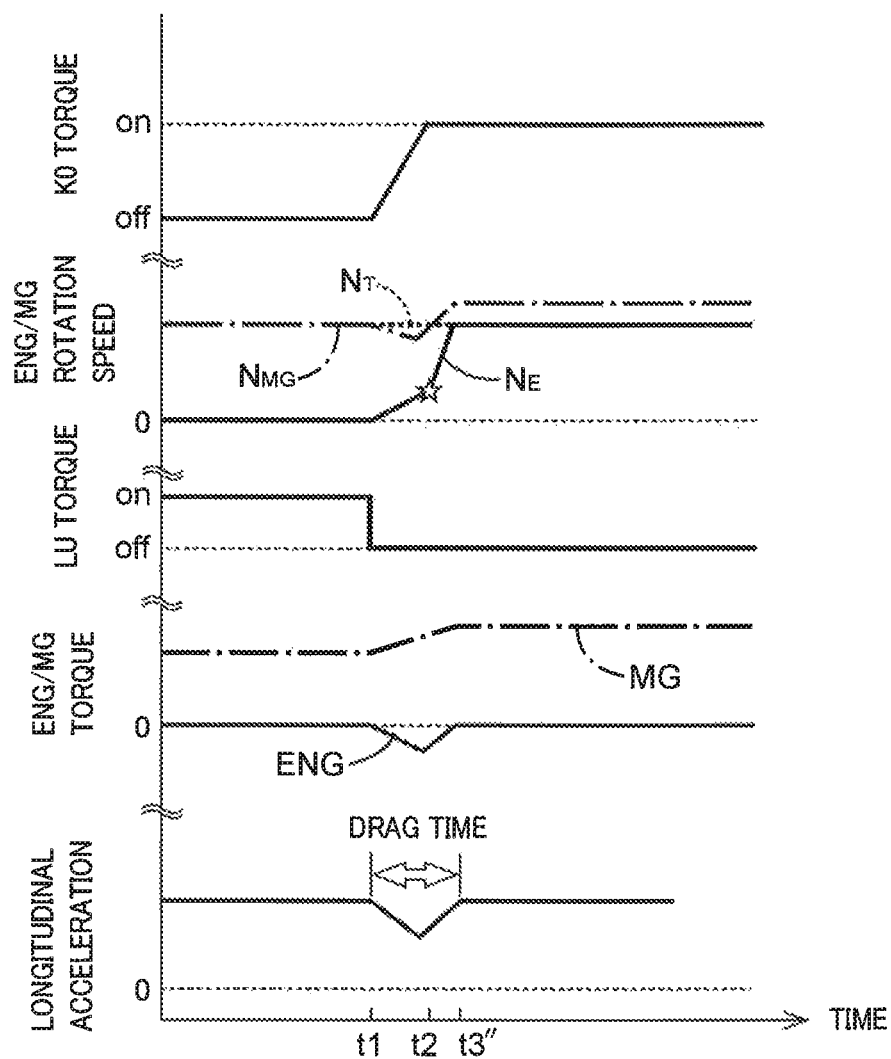
FIG. 7 is a time chart of relevant values such as rotation speeds of the portions and longitudinal acceleration generated in a vehicle associated with another control of this embodiment when the clutch in the hybrid vehicle of FIG. 1 is wrongly engaged in comparison to the example depicted in FIG. 5.

FIG. 5 is a time chart of relevant values such as rotation speeds of the portions and longitudinal acceleration generated in a vehicle when the clutch K0 is wrongly engaged in conventional technology for comparison with the present invention. In FIG. 5 and FIGS. 6 and 7 described later, the rotation speed or torque of the engine 12 is indicated by a solid line and the rotation speed or torque of the motor generator MG is indicated by a dashed-dotted line. In an example depicted in FIG. 5, wrong engagement of the clutch K0 occurs at time t1 due to breaking of wire etc., occurring in the first linear solenoid valve SL1, and a clutch torque is monotonically increased until the clutch K0 is completely engaged at time t2. A drag torque (negative torque) is generated in the engine 12 due to the wrong engagement of the clutch K0 and the rotation speed $N_E$ of the engine 12 is monotonically increased from time t1 to time t3. The longitudinal acceleration (deceleration G is generated in the vehicle from time t1 to time t3 in accordance with the drag torque of the engine and a driver may feel uncomfortable during this period because of the deceleration not attributable to accelerator operation etc.

FIG. 6 is a time chart of relevant values such as rotation speeds of the portions and longitudinal acceleration generated in a vehicle associated with control of this embodiment when the clutch K0 is wrongly engaged in comparison to the example depicted in FIG. 5. In the example depicted in FIG. 6, as is the case with the example depicted in FIG. 5 described above, wrong engagement of the clutch K0 occurs at time t1 due to breaking of wire etc., occurring in the first linear solenoid valve SL1, and a clutch torque is monotonically increased until the clutch K0 is completely engaged at time t2. In the control of this embodiment, the engine 12 is started (fired) and driven at the time of determination of the wrong engagement of the clutch K0. In FIG. 6, the start of the engine 12 is indicated by a star in the rotation speed. Although it is assumed that the wrong engagement of the clutch K0 is determined when the clutch K0 is completely engaged at time t2 and the drive of the engine 12 is started from time t2 for convenience of description, in an example of the wrong engagement of the clutch K0 determined before or after time t2, the drive of the engine 12 is started at the time. In the example depicted in FIG. 6, the engine 12 is subjected to the idle torque control after the engine 12 is ignited. As a result of this control, the increase in the rotation speed $N_E$ of the engine 12 converges at time t3 earlier than time t3 depicted in FIG. 5 and becomes substantially equal to the rotation speed $N_{MG}$ of the motor generator MG, which eliminates the acceleration (deceleration G) in the longitudinal direction of the vehicle due to the drag torque of the engine 12. Therefore, the drag time of the engine 12 can be reduced as compared to the conventional technology described with reference to FIG. 5 and the driver's uncomfortable feeling can preferably be suppressed.

FIG. 7 is a time chart of relevant values such as rotation speeds of the portions and longitudinal acceleration generated in a vehicle associated with another control of this embodiment when the clutch K0 is wrongly engaged in comparison to the example depicted in FIG. 5. In the example depicted in FIG. 7, as is the case with the example depicted in FIG. 5 described above, wrong engagement of the clutch K0 occurs at time t1 due to breaking of wire etc., occurring in the first linear solenoid valve SL1, and a clutch torque is monotonically increased until the clutch K0 is completely engaged at time t2. In the control of this embodiment, the engine 12 is started (fired) and driven at the time of determination of the wrong engagement of the clutch K0. In FIG. 7, the start of the engine 12 is indicated by a star in the rotation speed. Although it is assumed that the wrong engagement of the clutch K0 is determined when the clutch K0 is completely engaged at time t2 and the drive of the engine 12 is started from time t2 for convenience of description, in an example of the wrong engagement of the clutch K0 determined before or after time t2, the drive of the engine 12 is started at the time. In the example depicted in FIG. 7, at time t1 when an increase in the rotation speed $N_E$ of the engine 12 is determined, the lockup clutch LU is released so as to reduce the transmission torque of the lockup clutch LU. After time t2 when the engine 12 is started, a shift is made to the hybrid running mode in which the engine 12 and the motor generator MG are used as the drive sources for running, and the control (feedback control) of the engine 12 and the motor generator MG is provided so as to maintain at a constant value the turbine rotation speed $N_T$ (indicated by a bold broken line in FIG. 7) detected by the turbine rotation speed sensor 66 at time t1 when the increase in the rotation speed of the engine 12 is detected. As a result of this control, the increase in the rotation speed $N_E$ of the engine 12 converges at time t3" earlier than time t3 depicted in FIG. 5, which eliminates the acceleration (deceleration G) in the longitudinal direction of the vehicle due to the drag torque of the engine 12. Since the feedback control is provided from time t1 when the start of the increase is determined in the engine 12 until time t3" such that the turbine rotation speed $N_T$ is kept at a constant value, the uncomfortable feeling due to deceleration can more preferably be suppressed.

Therefore, the drag time of the engine 12 can be reduced as compared to the conventional technology described with reference to FIG. 5 and the driver's uncomfortable feeling can preferably be suppressed.

Figure 8:
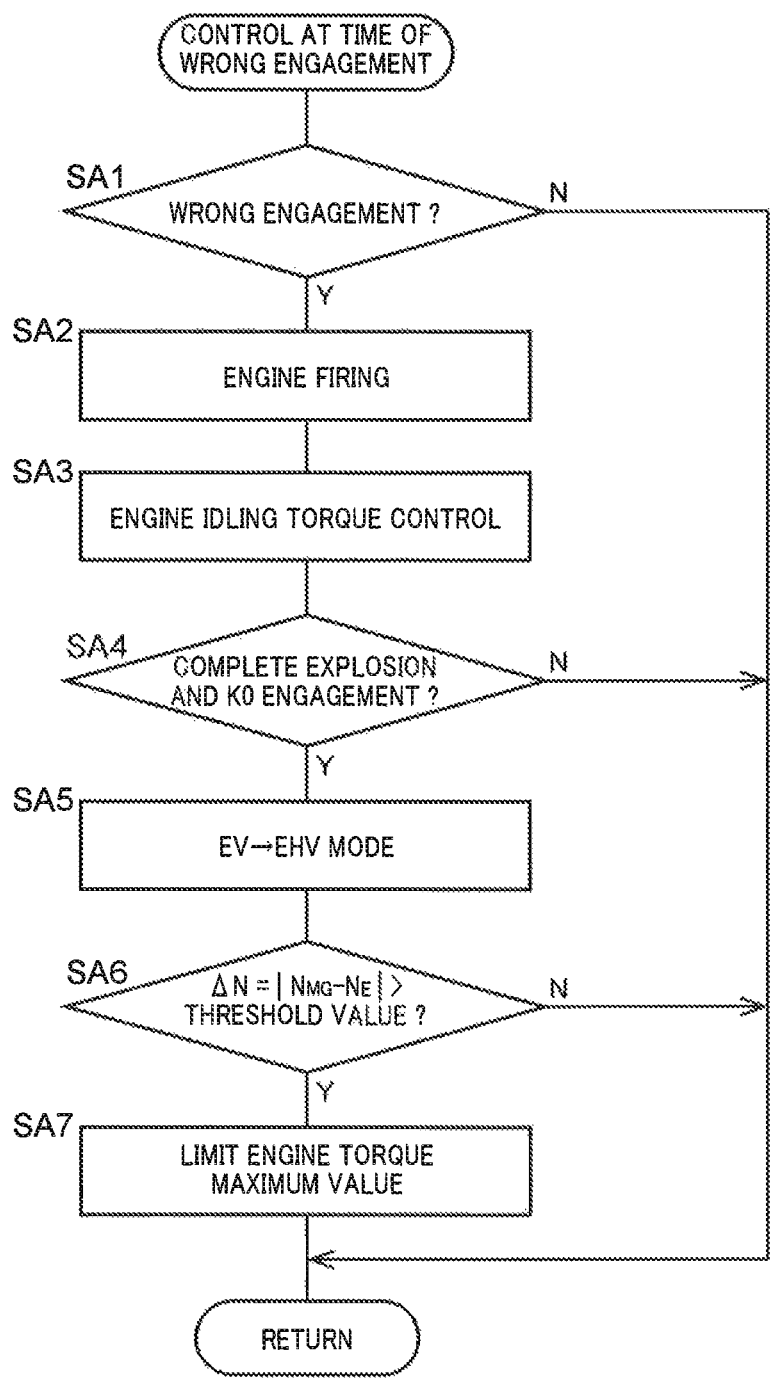
FIG. 8 is a flowchart for explaining a main portion of control by the electronic control device in a case of wrong engagement of the clutch in the hybrid vehicle of FIG. 1.

FIG. 8 is a flowchart for explaining a main portion of control by the electronic control device 58 in a case of wrong engagement of the clutch K0 and is repeatedly executed in a predetermined cycle.

First, at step (hereinafter, step will be omitted) SA1, it is determined whether the clutch K0 is wrongly engaged, based on a change in the rotation speed $N_E$ of the engine 12 detected by the engine rotation speed sensor 64. If the determination at SA1 is negative, this routine is terminated and, if the determination at SA1 is affirmative, an engine firing, i.e., the drive start control of the engine 12 is provided at SA2. At SA3, the idle torque control, i.e., the idling control of the engine 12 is provided. At SA4, complete explosion is achieved in the engine 12 and it is determined whether the clutch K0 is engaged. If the determination at SA4 is negative, this routine is terminated and, if the determination at SA4 is affirmative, the running mode of the vehicle is shifted at SA5 from the EV running mode in which only the motor generator MG is used as the drive source to the hybrid running mode in which the engine 12 and the motor generator MG are used as the drive sources. At SA6, it is determined whether a rotation speed difference $\Delta N$ $(=|N_{MG}-N_E|)$ between the rotation speed $N_E$ of the engine 12 and the rotation speed $N_{MG}$ of the motor generator MG is greater than a predefined threshold value (e.g., a slight value that is substantially zero). If the determination at SA6 is negative, this routine is terminated and, if the determination at SA6 is affirmative, at SA7, the upper limit value (maximum value) of the engine torque is limited to the output torque of the engine 12 at the time of affirmative determination at SA6, and this routine is terminated.

Figure 9:
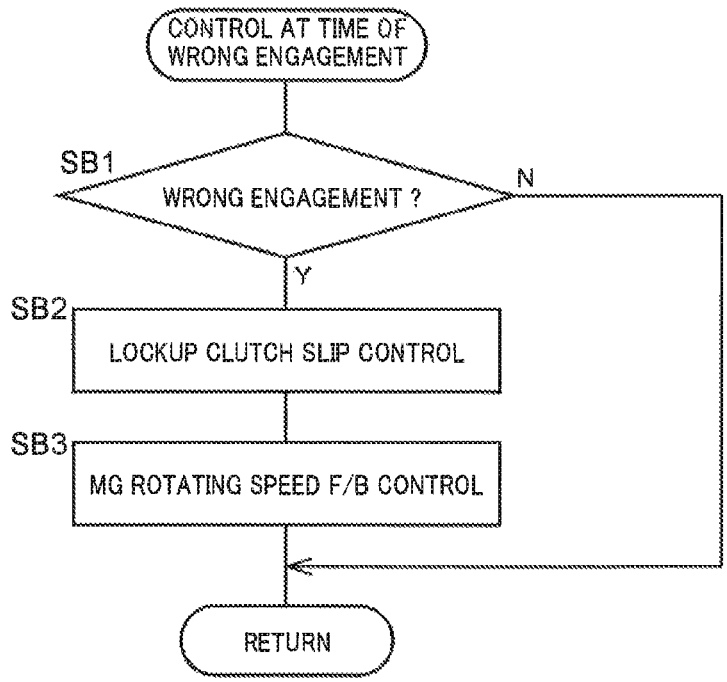
FIG. 9 is a flowchart for explaining a main portion of another control by the electronic control device in a case of wrong engagement of the clutch in the hybrid vehicle of FIG. 1.

FIG. 9 is a flowchart for explaining a main portion of another control by the electronic control device 58 in a case of wrong engagement of the clutch K0 and is repeatedly executed in a predetermined cycle.

First, at SB1, it is determined whether the clutch K0 is wrongly engaged, based on a change in the rotation speed $N_E$ of the engine 12 detected by the engine rotation speed sensor 64. If the determination at SB1 is negative, this routine is terminated and, if the determination at SB1 is affirmative, at SB2, the slip control (slip engagement control) of the lockup clutch LU is provided so as to reduce the transmission torque of the lockup clutch LU. At SB3, the rotation speed $N_{MG}$ of the motor generator MG is subjected to the feedback control so as to keep the output rotation speed, for example, the turbine rotation speed $N_T$ constant at the time of SB1 when the wrong engagement of the clutch K0 is detected, and this routine is terminated.

Figure 10:
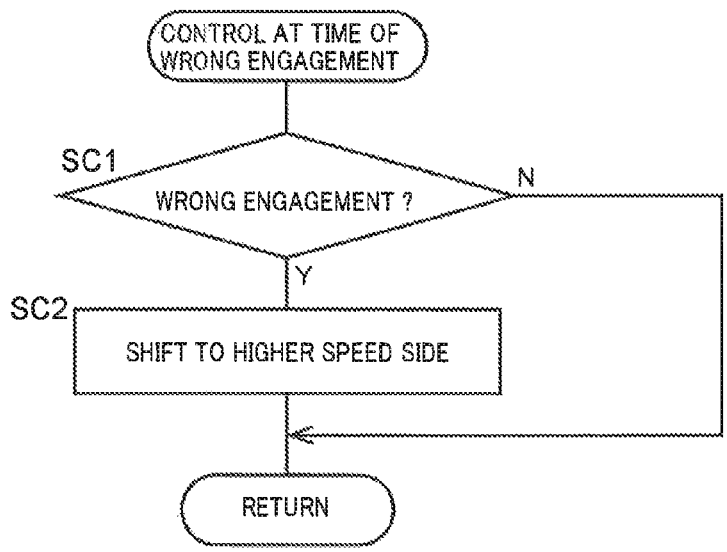
FIG. 10 is a flowchart for explaining a main portion of further control by the electronic control device in a case of wrong engagement of the clutch in the hybrid vehicle of FIG. 1.
Figure 11:
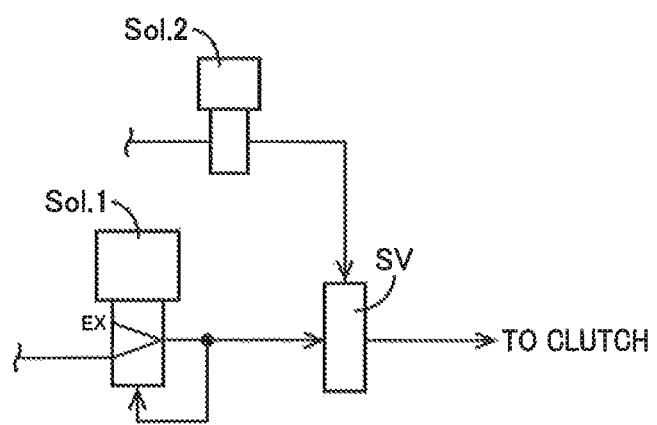
FIG. 11 is a diagram of an example of a hydraulic control circuit for controlling an engagement of the clutch in the conventional technology for comparison with the present invention.

FIG. 10 is a flowchart for explaining a main portion of further control by the electronic control device 58 in a case of wrong engagement of the clutch K0 and is repeatedly executed in a predetermined cycle.

First, at SC1, it is determined whether the clutch K0 is wrongly engaged, based on a change in the rotation speed $N_E$ of the engine 12 detected by the engine rotation speed sensor 64. If the determination at SC1 is negative, this routine is terminated and, if the determination at SC1 is affirmative, at SC2, a shift is made to a shift stage on the higher speed side (lower gear ratio side) as compared to the shift stage established at this time point in the automatic transmission 18, and this routine is terminated.

In the control described with reference to FIGS. 8 to 10, SA2, SA3, and SA7 correspond to the operation of the engine drive control means 74; SB3 corresponds to the operation of the motor generator drive control means 76; SC2 corresponds to the operation of the shift control means 78; SB2 corresponds to the operation of the lockup clutch engagement control means 80; and SA1, SB1, and SC1 correspond to the operation of the wrong engagement determining means 82.

As described above, according to this embodiment, in a case of wrong engagement where the clutch K0 is wrongly engaged during the EV running while the release instruction for the clutch K0 is output, the drive of the engine 12 is changed such that the rotation speed $N_E$ of the engine 12 approaches the rotation speed $N_{MG}$ of the motor generator MG and, therefore, the drag torque of the engine 12 can be suppressed regardless of the engagement state of the clutch K0, and the generation of longitudinal acceleration can be suppressed by reducing the slip time of the clutch K0. Therefore, the control device of the hybrid vehicle 10 can be provided that reduces a driver's uncomfortable feeling in a simplified manner in a case of wrong engagement of the clutch K0 disposed between the engine 12 and the motor generator MG.

Since the engine 12 is allowed to idle in the case of the wrong engagement, the engine brake torque can be suppressed regardless of the engagement state of the clutch K0 and the deceleration feeling can preferably be reduced in a case of wrong engagement of the clutch K0.

Since the hybrid running is performed with the engine 12 and the motor generator MG used as the drive sources in the case of the wrong engagement, a shift to the hybrid running can be made in accordance with the engagement state of the clutch K0 to preferably reduce a driver's uncomfortable feeling.

Since the upper limit value of the engine torque is defined based on the rotation speed difference $\Delta N$ between the rotation speed $N_E$ of the engine 12 and the rotation speed $N_{MG}$ of the motor generator MG in the case of the wrong engagement, a slip of the clutch K0 can preferably be restrained to suppress occurrence of troubles such as heat generation and loss increase in the clutch K0.

Since the lockup clutch LU is included in the power transmission path between the motor generator MG and the drive wheels 24 as a second clutch controlling the power transmission through the power transmission path depending on an engagement state and, if the rotation speed $N_E$ of the engine 12 is increased in the case of the wrong engagement, the transmission torque of the lockup clutch LU is reduced, the deceleration feeling in a case of wrong engagement of the clutch K0 can more preferably be reduced.

Although the preferred embodiment of the present invention has been described in detail with reference to the drawings, the present invention is not limited thereto and is implemented in other forms.

For example, although the hybrid vehicle 10 includes the one motor generator MG acting as the drive source during the EV running in the embodiment, this is not a limitation of the present invention and, for example, the present invention is preferably applied to a hybrid vehicle including a first motor generator used mainly as an electric generator and an engine starter motor and a second motor generator used mainly as a sub-drive source. Therefore, the control device of a hybrid vehicle of the present invention is widely applied to hybrid vehicles including an engine, a motor generator, and a clutch disposed in a power transmission path between the engine and the motor generator.

Although the clutch K0 disposed in the power transmission path between the engine 12 and the motor generator MG is a hydraulic friction engagement device having an engagement state hydraulically controlled in the embodiment, for example, an electromagnetic clutch or a magnetic particle clutch having an engagement state electromagnetically controlled may be disposed in the power transmission path between the engine 12 and the motor generator MG. Therefore, the present invention may widely be applied to hybrid vehicles with a clutch included in a power transmission path between an engine and a motor generator and controlling power transmission through the power transmission path.

Although the present invention is applied to the hybrid vehicle 10 including the stepped automatic transmission 18 including a plurality of the hydraulic friction engagement devices in the examples described in the embodiment, for example, the present invention is preferably applied to a hybrid vehicle including a CVT such as a belt type continuously variable transmission as the automatic transmission. In such a form, if wrong engagement of the clutch K0 is determined and an increase in the rotation speed of the engine 12 is detected, the control is preferably provided such as making a shift to a gear ratio on the higher speed side (lower gear ratio side) as compared to a gear ratio established at this time point in the CVT.

Although the present invention is applied to the hybrid vehicle 10 including the lockup clutch LU in the power transmission path between the motor generator MG and the drive wheels 24 as a second clutch controlling the power transmission through the power transmission path depending on an engagement state in the examples described in the embodiment, for example, a hydraulic friction engagement device for achieving a neutral state may be included as the second clutch in the power transmission path between the motor generator MG and the drive wheels 24 out of a plurality of the hydraulic friction engagement devices included in the automatic transmission 18.

Although not exemplarily illustrated one by one, the present invention is implemented with various modifications applied without departing from the spirit thereof.

NOMENCLATURE OF ELEMENTS

10: hybrid vehicle 12: engine 14: output control device 16: torque converter 16p: pump impeller 16t: turbine impeller 18: automatic transmission 20: differential gear device 22: axles 24: drive wheels 26: crankshaft 28: hydraulic pump 30: rotor 30a: boss portion 30b: rotor portion 30c: coupling portion 32: front cover 34: hydraulic control circuit 36: transmission case 38: clutch drum 40: clutch hub 42: friction engagement member 44: clutch piston 46: drive plate 48: rotation shaft 50: stator 50a: core 50b: coils 52: bearings 54: transmitting member 56: inverter 58: electronic control device 60: accelerator opening degree sensor 62: electric motor rotation speed sensor 64: engine rotation speed sensor 66: turbine rotation speed sensor 68: vehicle speed sensor 70: water temperature sensor 72: hybrid drive control means 74: engine drive control means 76: motor generator drive control means 78: shift control means 80: lockup clutch engagement control means 82: wrong engagement determining means K0: clutch LU: lockup clutch (second clutch) MG: motor generator SL1: first linear solenoid valve SL2: second linear solenoid valve Sol.1: linear solenoid valve (conventional technique) Sol.2: switching solenoid valve (conventional technique) SV: switching valve (conventional technique)

The invention claimed is:

1. A control device of a hybrid vehicle having a clutch in a power transmission path between an engine and a motor generator, the clutch controlling power transmission through the power transmission path depending on an engagement state, the control device interrupting the power transmission through the power transmission path by releasing the clutch during motor running, only the motor generator being used as a drive source for running in the motor running, wherein
    in a case of engagement where the clutch is engaged during the motor running while a release instruction for the clutch is output, drive of the engine is changed such that a rotation speed of the engine approaches a rotation speed of the motor generator, and
    in the case of the engagement, an upper limit value of an engine torque is defined based on a rotation speed difference between the rotation speed of the engine and the rotation speed of the motor generator.

2. The control device of a hybrid vehicle of claim 1, wherein in the case of the engagement, the engine is allowed to idle.

3. The control device of a hybrid vehicle of claim 1, wherein in the case of the engagement, hybrid running is performed with the engine and the motor generator used as drive sources for running.

4. The control device of a hybrid vehicle claim 1, wherein a second clutch is included in a power transmission path between the motor generator and drive wheels, wherein the second clutch controls power transmission through the power transmitting path depending on an engagement state, and wherein if the rotation speed of the engine is increased in the case of the engagement, a transmission torque of the second clutch is reduced.

\* \* \* \* \*